(12) United States Patent
Ault et al.

(10) Patent No.: US 8,454,368 B2
(45) Date of Patent: Jun. 4, 2013

(54) MEDICAL TRAINING METHODS AND DEVICES

(75) Inventors: Mark Ault, Los Angeles, CA (US); Brian Ault, Upland, CA (US)

(73) Assignee: Cedars-Sinai Medical Center, Los Angeles, CA (US)

(*) Notice: Subject to any disclaimer, the term of this patent is extended or adjusted under 35 U.S.C. 154(b) by 1198 days.

(21) Appl. No.: 12/324,525

(22) Filed: Nov. 26, 2008

(65) Prior Publication Data

US 2009/0142741 A1 Jun. 4, 2009

Related U.S. Application Data

(60) Provisional application No. 60/991,109, filed on Nov. 29, 2007, provisional application No. 60/991,113, filed on Nov. 29, 2007, provisional application No. 60/991,120, filed on Nov. 29, 2007.

(51) Int. Cl.
*G09B 23/28* (2006.01)

(52) U.S. Cl.
USPC ............................................. 434/267

(58) Field of Classification Search
USPC .................. 434/262, 267, 268, 272
See application file for complete search history.

(56) References Cited

U.S. PATENT DOCUMENTS

| | | | |
|---|---|---|---|
| 5,061,188 A | 10/1991 | McCollum | |
| 5,149,270 A * | 9/1992 | McKeown | 434/262 |
| 5,230,630 A * | 7/1993 | Burgett | 434/262 |
| 5,403,191 A * | 4/1995 | Tuason | 434/262 |
| 5,425,644 A * | 6/1995 | Szinicz | 434/268 |
| 5,839,904 A * | 11/1998 | Bloom | 434/268 |
| 5,947,743 A * | 9/1999 | Hasson | 434/262 |
| 6,336,812 B1 * | 1/2002 | Cooper et al. | 434/267 |
| 6,488,507 B1 * | 12/2002 | Stoloff et al. | 434/272 |
| 6,887,082 B2 * | 5/2005 | Shun | 434/267 |
| 7,255,565 B2 * | 8/2007 | Keegan | 434/272 |
| 7,306,465 B2 * | 12/2007 | White | 434/268 |
| 7,621,749 B2 * | 11/2009 | Munday | 434/262 |
| 7,837,473 B2 * | 11/2010 | Koh | 434/262 |
| 7,857,626 B2 * | 12/2010 | Toly | 434/267 |
| 7,931,471 B2 * | 4/2011 | Senagore et al. | 434/267 |
| 7,988,451 B2 * | 8/2011 | Battaglia, Jr. | 434/267 |
| 2001/0019818 A1 * | 9/2001 | Yong | 434/262 |
| 2007/0207448 A1 | 9/2007 | Glaser et al. | |
| 2010/0062408 A1 * | 3/2010 | Speller | 434/262 |

FOREIGN PATENT DOCUMENTS

| | | |
|---|---|---|
| EP | 1 406 229 | 4/2007 |
| WO | 2006-060406 | 6/2006 |

OTHER PUBLICATIONS

Landro, L. To Reduce Risks, Hospital Enlist 'Proceduralists'. The Wall Street Journal Online, Jul. 11, 2007. Reprinted by The New England Journal of Medicine. (2007) 15(5):1-4.

(Continued)

*Primary Examiner* — Kurt Fernstrom
(74) *Attorney, Agent, or Firm* — Linda B. Huber; Nixon Peabody LLP

(57) ABSTRACT

The present subject matter relates to medical training methods and models. In one embodiment, the invention provides for devices and methods of training paracentesis procedures. In another embodiment, the subject matter provides for devices and methods of training thoracentesis procedures. In yet another embodiment, the present subject matter provides for a training methods and model for performing lumbar punctures.

15 Claims, 9 Drawing Sheets

OTHER PUBLICATIONS

Liu et al. An Architecture for Simulating Needle-Based Surgical Procedures. Medical Image Computing and Computer-Assisted Intervention (MICCAI), Lecture Notes in Computer Science 2208. (2001). pp. 1137-1144.

Tzafestas et al. Paracentesis modeling and VR-based interactive simulation with haptic display for clinical skill training and assessment. Proceeding of the International Conference on Integrated Modeling & Analysis in Applied Control & Automation (IMAACA'2004) (Special Session on: Virtual Reality and Haptics for Modeling,Design and Interactive Simulation. 13M:International Mediterranean Modling Multiconference, Genoa, Italy), Oct. 28-31, 2004.

Waikakul et al. A Knee Model for Arthrocentesis Simulation. J. Med Assoc Thai. (2003). 86(3)282-287.

Wayne et al. Graduating internal medicine residents' self-assessment and performance of advanced cardiac life support skills. Medical Teacher. (2006). 28(4):365-369.

Colucci et al. More than Mannequins. Military Medical Technology, Feb. 10, 2004. vol. 8 Issue:1. Retrieved Dec. 26, 2007 http://www.military-medical-technology.com/print_article.cfm?DocID=400.

Otrompke et al. Medical Robotics stocks: A Shining Star for a Troubled Sea. (Dec. 13, 2007). Medical Robotics Magazine.

Thompson et al. Simulation in Medical Eduction: Report of the Task Force on Simulators in Education, CCOM Medical Education Committee. (Jun. 2006). pp. 1-30.

Gorman et al., A Prototype Haptic Lumbar Puncture Simulator, Medicine Meets Virtual Reality, (2000), pp. 106-109.

Moorthy et al., Validation of a Web-Based Training Tool for Lumbar Puncture, Studies in Health Technology and Informatics, (2003), pp. 219-225, 94, (Abstract Only).

Signh et al., Design of an Interactive Lumbar Puncture Simulator With Tactile Feedback Monograph, IEEE International Conference on Robotics and Automation Conference, (1994), pp. 1734-1739, pt. 2, (Abstract Only).

Taitz et al., Effect of the Introduction of a Lumbar-Puncture Sticker and Teaching Manikin on Junior Staff Documentation and Performance of Paediatric Lumbar Punctures, Quality & Safety in Health Care, (2006), pp. 325-328, 15.

* cited by examiner

MEDICAL TRAINING METHODS AND DEVICES

CROSS REFERENCE TO RELATED APPLICATIONS

This application claims the benefit of priority from U.S. Provisional Application Ser. No. 60/991,109, filed Nov. 29, 2007, U.S. Provisional Application Ser. No. 60/991,113, filed Nov. 29, 2007, and U.S. Provisional Application Ser. No. 60/991,120, filed Nov. 29, 2007.

FIELD OF PRESENT SUBJECT MATTER

This present subject matter relates to medical training methods and models. More specifically the present subject matter relates to training models for paracentesis procedures and thoracentesis procedures, and training methods and model for performing lumbar punctures.

BACKGROUND

All publications herein are incorporated by reference to the same extent as if each individual publication or patent application was specifically and individually indicated to be incorporated by reference. The following description includes information that may be useful in understanding the present subject matter. It is not an admission that any of the information provided herein is prior art or relevant to the presently claimed present subject matter, or that any publication specifically or implicitly referenced is prior art.

Paracentesis, also known as an abdominal tap or peritoneal tap, is a medical procedure involving needle drainage of fluid from a body cavity, most commonly the abdomen. Paracentesis may used for a number of reasons including: to relieve abdominal pressure from ascites; to diagnose spontaneous bacterial peritonitis and other infections (e.g. abdominal TB); to diagnose metastatic cancer; to diagnose blood in peritoneal space in trauma; and to puncture the tympanic membrane for diagnostic purposes, such as taking a bacterial swab from the middle ear.

The procedure is generally performed as an out-patient procedure and although it is considered safe, is often prone to the risk of infection, excessive bleeding or perforating a loop of bowel. During the procedure, patients are prepped and a needle, along with a plastic sheath, is inserted into the abdominal cavity. The needle is then removed, leaving the plastic sheath behind to allow drainage of the fluid. The fluid can be drained by gravity or by connection to a vacuum bottle. The procedure is generally not painful, however, if performed improperly, the needle can puncture the bowel, bladder, a blood vessel, or other organs in the abdomen. The unintentional puncture of adjacent organs may be due to a caregivers inexperience, or lack of mastering proper paracentesis techniques and procedures. As affordable training models are unavailable in the present art, practicing paracentesis training techniques are limited to training on expensive models, which cost upwards of twenty-seven thousand dollars, and are in high demand. Accordingly these models are rarely accessible to medical students and caregivers, leading medical students and caregivers to practice techniques based on the common 'see one do one' methodology on human patients. As can be expected, this predominant methodology leads to caregivers with minimal training and experience, and often times apprehensive practitioners and caregivers. Accordingly, the inexperienced practitioners and caregivers may experience higher incidents of complications leading to unnecessary risks, pain and morbidity to the patient.

Accordingly, there exists a need in the art to provide a realistic and affordable method and device for training, practicing and perfecting paracentesis techniques and procedures.

Thoracentesis, also known as pleural fluid aspiration or pleural tap, is the procedure for removing fluid from the space between the lining of the outside of the lungs and the wall of the chest. The procedure involves placing a needle through the skin of the chest wall into the space around the lungs known as the pleural space. Fluid is subsequently withdrawn and collected and may be sent to a laboratory for analysis.

This procedure is indicated when unexplained fluid accumulates in the chest cavity outside the lung. In a great number of cases, analysis of pleural fluid yields clinically useful information. If a large amount of fluid is present, then this procedure can also be used therapeutically to remove that fluid and improve patient comfort and lung function. The most common causes of pleural effusions are cancer, congestive heart failure, pneumonia, and recent surgery.

Complications may occur if the procedure is improperly performed. Even in the presence of an attending physician, inexperienced practitioners and caregivers can place the patient at risk for complications due to poor technique, inability to adequately identify landmarks, lack of experience and improper utilization of a needle-catheter apparatus. Major complications associated with thoracentesis include, pneumothorax, hemopneumothorax, hemorrhage, hypotension (low blood pressure due to a vasovagal response) and reexpansion pulmonary edema. Minor complications include a dry tap (no fluid return), subcutaneous hematoma or seroma, anxiety, dyspnea and cough (after removing large volume of fluid).

Training models currently exist for teaching and practicing thoracentesis, however these models are prohibitively expensive for general use. Models created by Advance Medical Technologies, LLC, and Laerdal, LLC, cost upwards of several thousand dollars, making these models impractical for practitioner or caregiver to own or rent. Even less expensive models such as those provided by Pacific Research Laboratories, Inc., cost several hundred dollars, making it unaffordable for practitioners or caregivers. In addition, several example models are further limited by their inability to make repeated attempts with the standard 8F catheter without causing damage to the model, rendering the models unusable for further procedure training without the purchase of replacement accessories.

Accordingly, there exists a need in the art for an affordable thoracentesis training method and device that enables a practitioner or caregiver to learn and practice thoracentesis procedures.

The lumbar puncture, also known as a spinal tap, is a diagnostic and at times therapeutic procedure that is performed in order to collect a sample of cerebrospinal fluid ("CSF") for biochemical, microbiological, and cytological analysis, or occasionally as a treatment ("therapeutic lumbar puncture") to relieve increased intracranial pressure. The most common purpose for a lumbar puncture is to collect cerebrospinal fluid in a case of suspected meningitis, since there is no other reliable tool with which meningitis can be excluded and it is often a lifethreatening but highly treatable condition. Young infants commonly require lumbar puncture as a part of the routine workup for fever without a source, as they have a much higher risk of meningitis than older persons and do not reliably show signs of meningeal irritation (meningismus). Lumbar punctures may also be performed to inject medications into the cerebrospinal fluid ("intrathecally"), particularly for spinal anesthesia or chemotherapy.

The procedure is performed by first placing the patient in a left (or right) lateral position with his/her neck bent in full flexion and knees bent in full flexion up to his/her chest, approximating the fetal position. Once the appropriate location is palpated, local anesthetic is administered under the skin and then injected along the intended path of the spinal needle. A spinal needle is inserted between the lumbar vertebrae L3/L4 or L4/L5 and pushed in until there is a "give" that indicates the needle is past the dura mater. The stylet from the spinal needle is then withdrawn and drops of cerebrospinal fluid are collected. The procedure is completed by withdrawing the needle while placing pressure on the puncture site.

Current methods for training of this procedure are usually done on the patient guided by experienced supervising physicians. Incorrect techniques resulting from inadequate training or supervision can result in sub-optimal outcomes, unnecessary pain and suffering by patients. Although serious complications of an improperly performed lumbar puncture are extremely rare, they include spinal or epidural bleeding, and trauma to the spinal cord or spinal nerve roots resulting in weakness or loss of sensation, or even paraplegia. In addition there are case reports of lumbar puncture resulting in perforation of abnormal dural arterio-venous malformations, resulting in catastrophic epidural hemorrhage.

Although there are current training models for teaching and practicing a lumbar puncture, these models are prohibitively expensive for general use and cost upwards of several thousand dollars, making the models impractical for practitioner or caregivers to own. For instance, Simulution provides a spinal injunction simulation training model (http://www.simulution.com/shop-online/spinal/spinal-injection-simulator) which is a bare-bones training device, costing nearly one-thousand dollars.

Consequently, there exists a need in the art for an affordable lumbar puncture training method and device that enables a practitioner or caregiver to learn and practice lumbar puncture procedures.

BRIEF DESCRIPTION OF THE FIGURES

Exemplary embodiments are illustrated in referenced figures. It is intended that the embodiments and figures disclosed herein are to be considered illustrative rather than restrictive.

DESCRIPTION OF THE PRESENT SUBJECT MATTER

All references cited herein are incorporated by reference in their entirety as though fully set forth. Unless defined otherwise, technical and scientific terms used herein have the same meaning as commonly understood by one of ordinary skill in the art to which this present subject matter belongs. One skilled in the art will recognize many methods and materials similar or equivalent to those described herein, which could be used in the practice of the present subject matter. Indeed, the present subject matter is in no way limited to the methods and materials described.

The present subject matter relates to medical training methods and models, specifically for paracentesis and thoracentesis procedures, and for performing lumbar punctures.

The present subject matter provides paracentesis and thoracentesis training devices that allow for instruction on proper paracentesis and thoracentesis procedures and for practicing proper techniques relating to paracentesis and thoracentesis procedures. Furthermore, the paracentesis and thoracentesis training devices are an affordable option for training medical students and professionals the proper techniques of paracentesis and thoracentesis procedures.

In various embodiments, the paracentesis and thoracentesis training device may comprise a container to allow for fluid storage, and an interface adapted to allow resealable punctures. The interface may be embedded with rods, mesh, cartilage or other suitable components intended to simulate the anatomical structure of the human body. As an example, the interface may be embedded with a plurality of rods to simulate human rib bones.

Figure 1:
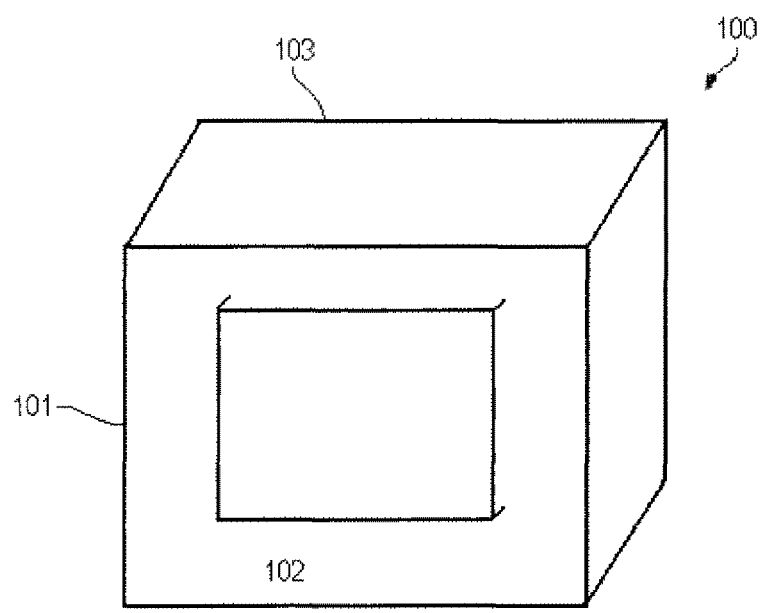
FIG. 1 depicts a paracentesis/thoracentesis training device in accordance with an embodiment of the present subject matter.

As illustrated in FIG. 1, an embodiment of the present subject matter includes a container 101 with an interface 102. The container 101 may further include a lid 103 to open and fill the container with a liquid. Objects to simulate organs ("organ simulators") may also be placed in the container. For example, models to simulate intestinal loops, lung tissue or subdiaphragmatic structures (erg., liver, spleen, bowel) are placed in the container. The organ simulators may comprise silicone. Additionally, the organ simulators may further comprise natural fibers to add texture and contour to the organ simulators. The organ simulators may be directly attached to the container. In an alternative embodiment, the organ simulators may be suspended in a mesh material so that the organs appear to be floating in the fluid. The interface 102 may be removably attached to the container. The interface 102 may be configured on any portion of the container 101. In one embodiment, as illustrated in FIG. 1, the interface 102 is positioned on the front portion of the container 101 where it may conveniently allow a user to practice paracentesis or thoracentesis procedural techniques.

The container 101 may be shaped, in any number of configurations. In the embodiment depicted in FIG. 1, the container 101 is generally box-shaped (i.e., rectangular prism). In alternate embodiments, the container 101 may be any three dimensional shape that may impart a convenient shape to aid an instructor in demonstrating paracentesis or thoracentesis procedures and/or to allow a user to learn and practice the paracentesis or thoracentesis procedure.

Figure 2:
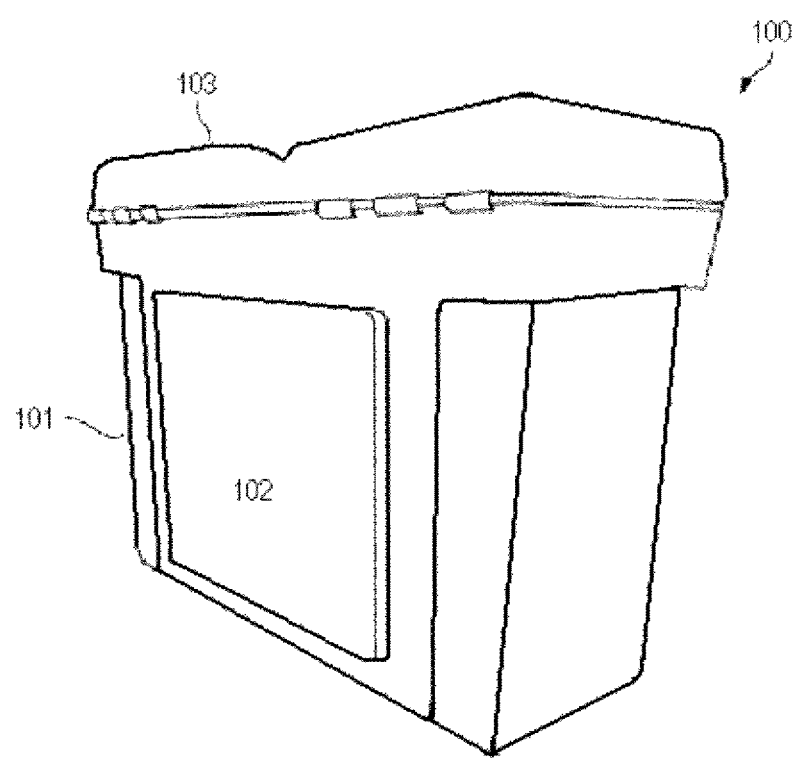
FIG. 2 depicts an image of a paracentesis training device with Neoprene® elastomer in accordance with an embodiment of the present subject matter.
Figure 3:
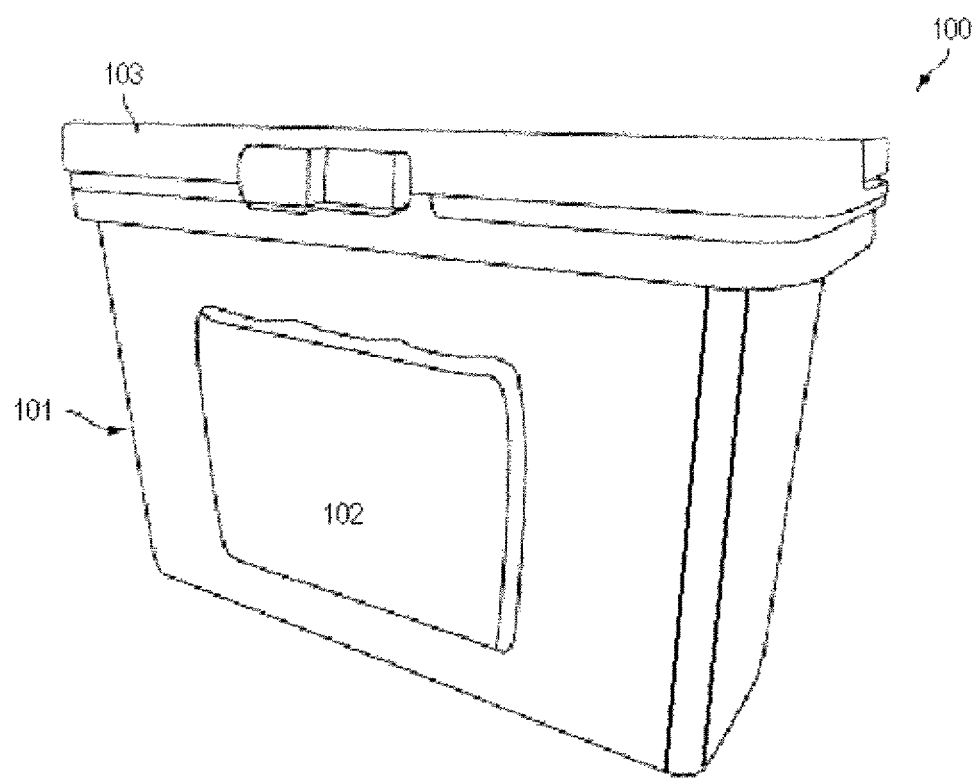
FIG. 3 depicts an image of a paracentesis training device with de-aerated silicone in accordance with an embodiment of the present subject matter. The de-aerated silicone enables the use of ultrasound on the paracentesis training device.

In one embodiment, depicted in FIG. 2, the interface 102 may be made of an elastomer (e.g., Neoprene® elastomer from DuPont) or silicone. The thickness of the interface material may be from about ½ inch thick to a thicker structure to allow for reproduction of greater degrees of adiposity and procedural difficulty. The interface provides a substantially accurate simulation of the human physiology. As one of skill in the art will readily appreciate, the interface may be constructed of a wide variety of materials that are typical for products of this nature. The materials may be selected based on their appearance, cost, durability, tactile feel, turgor, tensile strength, resealability and the like. In particular embodiments, materials providing a substantially accurate tactile feel of the human physiology, and/or providing an appropriate turgor and tensile strength of the skin, may be appropriate.

Figure 5:
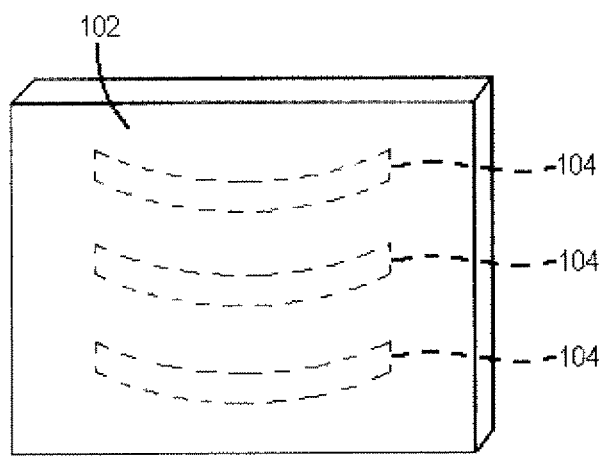
FIG. 5 depicts an interface embedded with rods in accordance with an embodiment of the present invention.

FIG. 5 depicts the front view of an embodiment of the present subject matter, wherein interface 102 is embedded with a plurality of rods 104 to simulate human rib bones. The rods 104 are depicted with dotted lines to indicate that they are embedded within the interface and are not readily visible to the user. In an alternative embodiment, the rods 104 may be placed in contact or in close proximity with the rear side of interface 102, wherein the rods 104 are visible from the rear side of the interface, but when in use, the rods 104 are not readily visible to the user (not shown). In one embodiment, the rods 104 may be constructed of metal. However, one of skill in the art will readily appreciate that the rods may be constructed of a wide variety of materials such as plastics and other synthetic materials.

In another embodiment, the paracentesis or thoracentesis training device may comprise molded de-aerated silicone. Performance of the paracentesis and thoracentesis procedures embodies two skill sets. The first is identification of pleural fluid and adjacent anatomic structures via ultrasound. The second is the passage of the fluid removing needle into the pleural space. The use of de-aerated silicone allows the penetration of sound waves, and thus enables the use of ultrasound on the training devices, such that the underlying organ structures can be replicated. The silicone is prepared by a de-aeration process to remove air bubbles from the silicone mixture by the addition of a vacuum to the mixed material before pouring of the material into molds to cure. Alternative de-aeration methods known in the art may be used to prepare the silicone. In one embodiment, the silicone may be de-aerated for approximately 15-20 minutes using a low suction vacuum pump. In another embodiment, the silicone material may be mixed under a vacuum to de-aerate the material.

Figure 4:
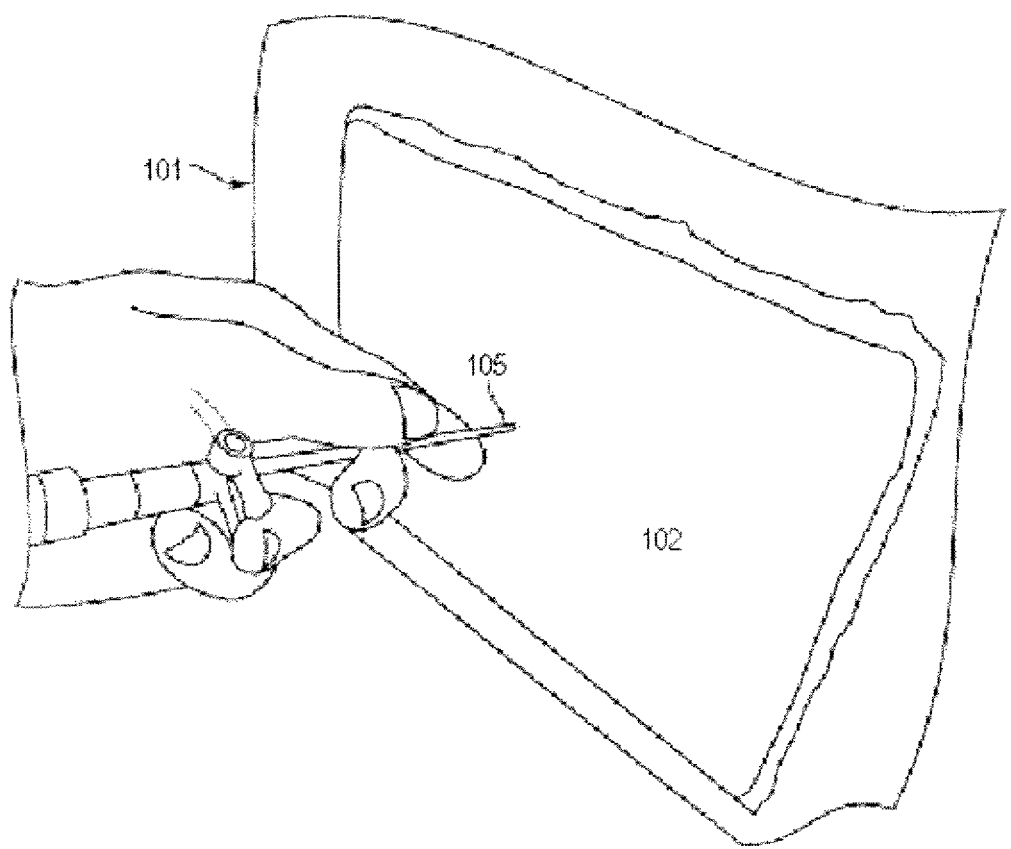
FIG. 4 depicts a user practicing a paracentesis procedure on a paracentesis training device in accordance with an embodiment of the present subject matter.

In various embodiments, the present subject matter provides for a method of using the paracentesis and thoracentesis training devices comprising providing the paracentesis and thoracentesis training devices of the present subject matter as described above, and demonstrating or practicing a skill on the paracentesis or thoracentesis training device. Skills that can be demonstrated or practiced on the paracentesis training device include, but are not limited to identification of the appropriate landmark structures either by palpation and/or by ultrasound guidance; application of local anesthesia; demonstration of the proper method for holding and orienting the syringe or needle 105 (seen in FIG. 4) with stabilization of the operator's hands against the abdominal wall to prevent injury to the patient due to unexpected movement; insertion of the paracentesis needle 105 in an anatomically correct orientation (seen in FIG. 4), passage of the paracentesis needle to the proper depth; recognition of aberrant placement and recognition of the resultant "pop" visually and palpably replicating passage into the peritoneal space; demonstration of correct technique to check for return of ascites fluid prior to removal of the needle stylet; withdrawal of the stylet to allow connection of the drainage apparatus with collection of diagnostic samples, drainage of ascites fluid into the bag collection system; and demonstration of appropriate sharp and biohazard safety techniques. In various embodiments, removing fluid may be performed by aspiration, drainage or both.

In addition, the thoracentesis training model allows demonstration, practice and mastery of critical skill in the performance of thoracentesis. In various embodiments, the skills that are demonstrated or practiced include but are not limited to identification of the appropriate landmark structures by palpitation and/or by ultrasound guidance; application of local anesthesia; demonstration of the proper method for holding and orienting the thoracentesis needle via stabilization of the operator's hands against the chest wall to prevent injury to the patient due to unexpected movement; insertion of the thoracentesis needle in an anatomically correct orientation; passage of the thoracentesis needle to the proper depth, recognition of aberrant placement of the throacentesis needle; recognition of the resultant "pop" visually and palpably replicating entry of the needle into the pleural space; demonstration of the correct technique to check for return of pleural fluid prior to removal of the needle stylet; withdrawal of the stylet to allow connection of the drainage apparatus with collection of diagnostic samples; drainage of pleural fluid into the bag collection system; and demonstration of appropriate sharps and biohazard safety techniques.

Furthermore, the present subject matter provides for a lumbar puncture training device to enable teaching and practicing a lumbar puncture, as well as a method of using the lumbar puncture training device.

In various embodiments, the lumbar puncture training device comprises a covering material and a spine simulator comprising an elastic tubing material placed through a component that simulates a spinous process of a vertebra ("spinous process component"), wherein the covering material surrounds the spine simulator. One of skill in the art will appreciate that the size of the spinous process component may vary to simulate a variety of spines, including pediatric, adolescent, or adult spines.

In one embodiment, the spinous process component may be a core and disc assembly. Each core and disc assembly simulates a spinous process of a vertebra. In various embodiments, the inside diameter of the core may be about $5/16$ inch to about $9/16$ inch, and the outside diameter may be about $½$ inch to about $⅞$ inch; the inside diameter of the disc may be about $5/16$ inch to about $7/16$ inch, and the outside diameter of the disc may be about $¾$ inch to about $5/4$ inch. In a particular embodiment of an adult size model, the inside diameter of the core may be about $9/16$ inch and the outside diameter may be about $⅞$ inch, the inside diameter of the disc may be about $7/16$ inch and the outside diameter may be about $5/4$ inch. In a particular embodiment of a pediatric size model, the inside diameter of the core may be about $5/16$ inch and the outside diameter may be about $½$ inch; the inside diameter of the disc may be about $5/16$ inch and the outside diameter may be about $¾$ inch. The core and disc may be comprised of a hardened material such a metal alloy, plastic or other suitable materials, or combinations thereof.

In one embodiment, the lumbar puncture training device further comprises a holder for stabilization, which more accurately simulates a patient's back. In a particular embodiment, the holder may be dome-shaped. However, one of skill in the art will recognize that the holder may be any suitably shaped holder.

In various embodiments, the covering material may be an elastomer (e.g., Neoprene® elastomer from DuPont) or silicone. Neoprene® elastomer may be optimal for simulations with the greatest economic benefit, while silicone may be suitable for ultrasound applications and may have increased user longevity. One of skill in the art will appreciate that other materials may be appropriate to use as the covering material. Covering materials that are suitable should have a malleable surface turgor to allow palpation of the landmark assembly units, a density that replicates the density of subcutaneous tissue and ligamentous structures, durability to allow multiple attempts without anatomic distortion or disintegration, an elastic memory to prevent deformity with vigorous palpation and needle passes.

In various embodiments, the elastic tubing material may be rubber, latex, silicone and the like. Latex rubber tubing may be adequate and inexpensive. Silicone rubber tubing, while somewhat more expensive, may have advantages in certain circumstances. One of skill in the art will appreciate that other elastic materials may be appropriate to use as the elastic tubing material. The elastic tubing material serves as a model spinal canal and may be filled with a fluid to simulate spinal fluid. In one embodiment, the tubing diameter for an adult simulation model may be about ½ inch. The tubing diameter may be varied to smaller sizes such as about ¼ inch for pediatric simulation models, or ⅜ inch for small adult simulation models.

Figure 8:
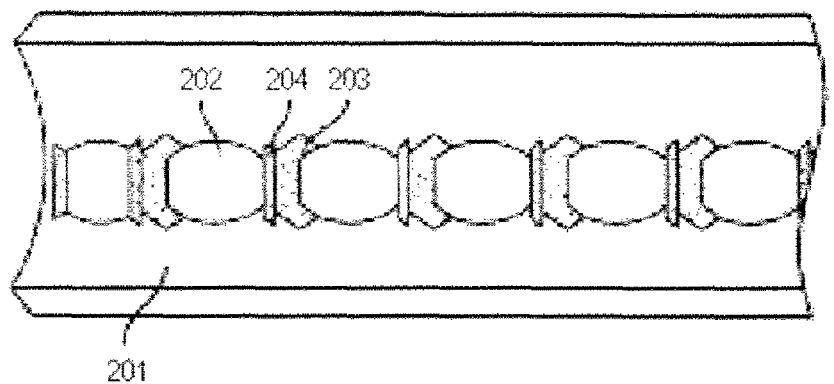
FIG. 8 depicts a lumbar puncture training device in accordance with an embodiment of the present invention.
Figure 9:
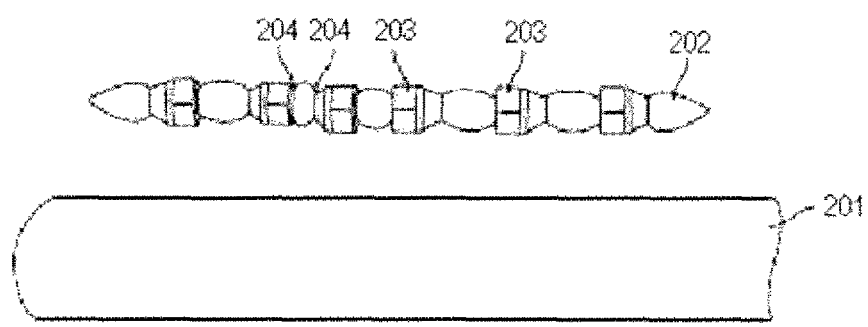
FIG. 9 depicts certain components of the lumbar puncture training device in accordance with an embodiment of the present invention.
Figure 10:
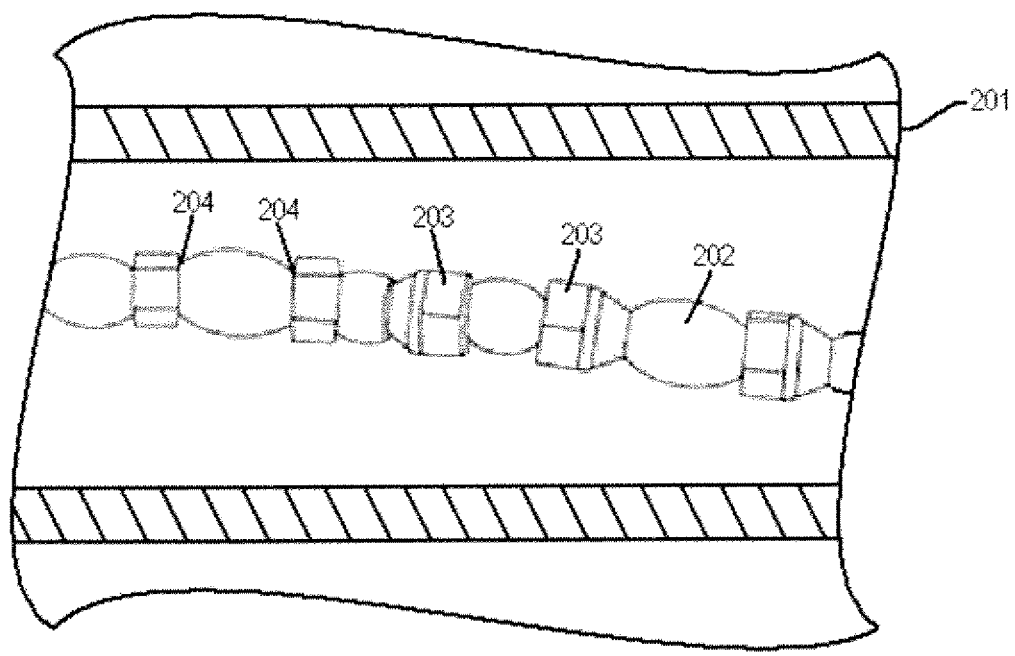
FIG. 10 depicts the cross sectional view of the lumbar puncture training device in accordance with an embodiment of the present invention.

As illustrated in FIG. 8, an embodiment of the invention includes a covering material 201, an elastic tubing material 202 that is placed through one or more core(s) 203, and disc(s) 204 assemblies. The tubing material 202 is filled with a liquid to simulate spinal fluid. The covering material 201 is closed with an adhesive (not shown).

In various embodiments, the present invention provides a method of using the lumbar training device, comprising one or more steps selected from the group consisting of: providing a lumbar training device of the present invention as described above, and demonstrating and/or practicing skills in the performance of lumbar puncture. Demonstrating and/or practicing skills include but are not limited to identification of the appropriate landmark structures; application of local anesthesia, demonstration of the proper method for holding and orienting the spinal needle; insertion of the spinal needle in an anatomically correct orientation; passage of the spinal needle to the proper depth; recognition of aberrant placement; recognition of the resultant "pop" replicating passage through the intraspinous ligament; demonstration of correct technique to check for return of spinal fluid in the needle chamber; withdrawal of the stylet to show free flow of fluid and replacement of the stylet before removing the spinal needle; demonstration of appropriate sharp and biohazard safety techniques.

The present subject matter is also directed to kits for paracentesis and/or thoracentesis procedural training. The kit may be an assemblage of materials or components, including a paracentesis training device and/or a thoracentesis training device, described above. Instructions for use may be included in the kit. "Instructions for use" typically include a tangible expression describing the technique to be employed in using the components of the kit to perform or practice the proper techniques for a paracentesis or thoracentesis procedure and/ or to perform or practice the proper techniques for a lumbar puncture. Optionally, the kit may also contain other useful components, such as, needles, fluids, syringes, spinal needles, catheters, bandaging materials or other useful paraphernalia as will be readily recognized by those of skill in the art.

The present subject matter is also directed to a kit to enable teaching and practicing the lumbar puncture procedure. The kit is an assemblage of materials or components, including a lumbar puncture training device as described above. Instructions for use may be included in the kit. "Instructions for use" typically include a tangible expression describing the technique to be employed in using the components of the kit to perform or practice the proper techniques for a lumbar puncture. Optionally, the kit also contains other useful components, such as, fluids, spinal needles, syringes, catheters, bandaging materials or other useful paraphernalia as will be readily recognized by those of skill in the art.

EXAMPLES

The following examples are provided to better illustrate the claimed present subject matter and are not to be interpreted as limiting the scope of the present subject matter. To the extent that specific materials are mentioned, it is merely for purposes of illustration and is not intended to limit the present subject matter. One skilled in the art may develop equivalent means without the exercise of inventive capacity and without departing from the scope of the present subject matter.

Example 1

Figure 6:
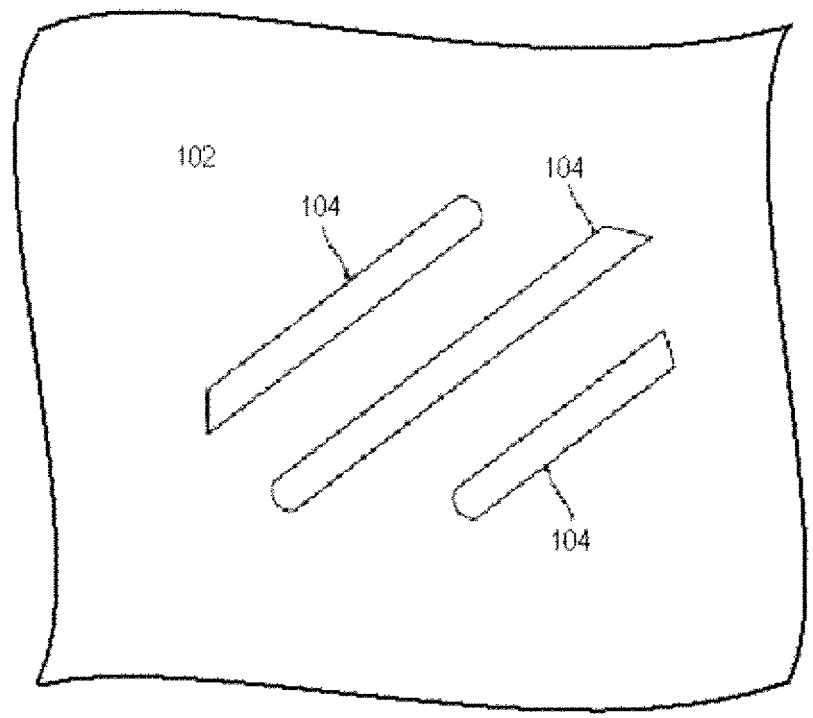
FIG. 6 depicts a thoracentesis training device prior to affixing an interface in accordance with an embodiment of the present invention.
Figure 7:
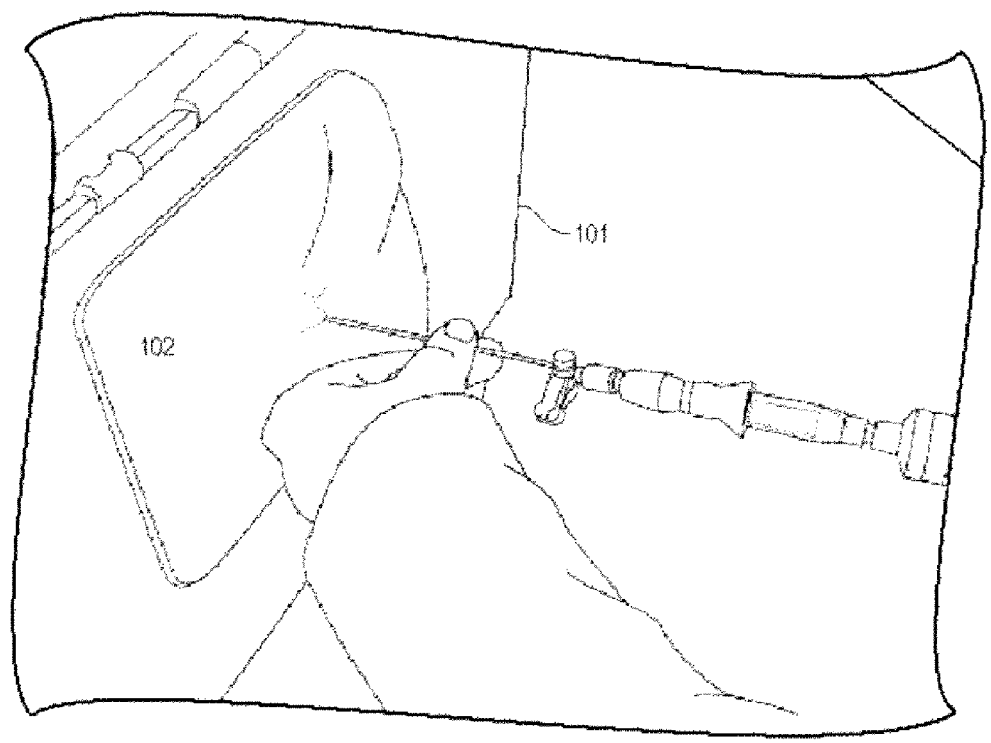
FIG. 7 depicts a user practicing a throacentesis procedure on a thoracentesis training device in accordance with an embodiment of the present invention.

Paracentesis/thoracentesis training models were constructed by using a plastic storage container and removing a portion of the front of the container to create at least one opening (see FIG. 6). A silicone insert (interface) was placed over the opening. The container was filled with water by opening the lid located on the top of the container, placing water into the container and closing the container. In various embodiment, rods were affixed to the container to simulate human rib bones. A user can practice paracentesis procedures and/or thoracentesis procedures by aspirating fluid from the container with a paracentesis or thoracentesis needle.

Example 2

Latex tubing was placed through several core and disc assemblies. The tubing was filled with a liquid and sealed. Neoprene was wrapped around the tubing and core/disc assemblage and closed with an adhesive.

Various embodiments of the present subject matter are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the present subject matter known to applicanta at this time of filing the application has been presented and is intended for the purposes of illustration and description. The present description is not intended to be exhaustive nor limit the present subject matter to the precise form disclosed and many modifications and variations are possible in the light of the above teachings. The embodiments described serve to explain the principles of the present subject matter and its practical application and to enable others skilled in the art to utilize the present subject matter in various embodiments and with various modifications as are suited to the particular use contemplated. Therefore, it is intended that the present subject matter not be limited to the particular embodiments disclosed for carrying out the present subject matter.

While particular embodiments of the present subject matter have been shown and described, it will be obvious to those skilled in the art that, based upon the teachings herein, changes and modifications may be made without departing from this present subject matter and its broader aspects. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. A paracentesis/thoracentesis training device comprising:
   a container adapted for fluid storage surrounding at least one simulated organ;
   an interface affixed to the container and adapted for resealable puncturing;
   a resealable lid enclosing the container; and
   the at least one simulated organ removably affixed within the container.

2. The device according to claim 1, wherein the interface contains at least one non-penetrable element.

3. The device according to claim 1, wherein the interface is constructed of a material selected from the group consisting of silicone, elastomer, rubber and elastic polymer.

4. The device according to claim 1, wherein the at least one simulated organ is selected from the group consisting of a liver, a spleen, bowel, heart tissue, intestinal loops, subdiaphragmatic structures and lung tissue.

5. The device according to claim 1, wherein the at least one simulated organ is constructed of a material selected from the group consisting of silicone, de-aerated silicone, elastomer, rubber and natural fibers.

6. A method of paracentesis/thoracentesis training comprising:
   providing a device comprising:
   a container allowing for fluid storage,
   an interface affixed to the container and adapted for resealable puncturing,
   a resealable lid enclosing the container, and
   at least one simulated organ removably affixed within the container;
   identifying appropriate landmarks for insertion of a needle with a stylet;
   inserting the needle into the interface;
   recognizing aberrant placement of the needle into the simulated fluid cavity;
   removing the needle stylet for connection of the needle to a drainage apparatus;
   and draining excess fluid from the device.

7. The method of claim 6, wherein identification of appropriate landmarks is assisted by palpitation.

8. The method of claim 6, wherein identification of appropriate landmarks is assisted by ultrasound.

9. The method of claim 6, wherein application of a local anesthetic is applied to the interface area prior to inserting the needle.

10. The method of claim 6, wherein emission of fluid is identified prior to removal of the needle stylet.

11. The method of claim 6, wherein the interface contains at least one non-penetrable element.

12. The method of claim 6, wherein the interface is constructed of a material selected from the group consisting of silicone, elastomer, rubber and elastic polymer.

13. The method of claim 6, wherein the at least one simulated organ is selected from the group consisting of a liver, a spleen, bowel, heart tissue, intestinal loops, subdiaphragmatic structures and lung tissue.

14. The method of claim 6, wherein the at least one simulated organ is constructed of a material selected from the group consisting of silicone, de-aerated silicone, elastomer, rubber and natural fibers.

15. The method of claim 6, wherein the container is adapted for fluid storage surrounding the at least one simulated organ.

* * * * *